US012656542B2

(12) United States Patent
Takahashi et al.

(10) Patent No.: US 12,656,542 B2
(45) Date of Patent: Jun. 16, 2026

(54) DISPLAY DEVICE AND ILLUMINATION DEVICE

(71) Applicant: Japan Display Inc., Minato-ku (JP)

(72) Inventors: Yasuhiro Takahashi, Tokyo (JP); Junko Nagasawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 19/286,849

(22) Filed: Jul. 31, 2025

(65) Prior Publication Data

US 2026/0036736 A1     Feb. 5, 2026

(30) Foreign Application Priority Data

Jul. 31, 2024     (JP) ................................. 2024-124582

(51) Int. Cl.
*F21V 8/00*          (2006.01)
*G02F 1/13357*     (2006.01)
(52) U.S. Cl.
CPC ........... *G02B 6/005* (2013.01); *G02B 6/0091* (2013.01); *G02F 1/133615* (2013.01)
(58) Field of Classification Search
CPC .. G02B 6/005; G02B 6/0091; G02F 1/133615
See application file for complete search history.

(56) References Cited

U.S. PATENT DOCUMENTS

| | | | |
|---|---|---|---|
| 12,158,670 B1* | 12/2024 | Rodrigues | G02B 6/0068 |
| 2022/0035189 A1* | 2/2022 | Asozu | G09F 9/00 |
| 2023/0004029 A1* | 1/2023 | Rodrigues | G02F 1/133723 |
| 2023/0359096 A1* | 11/2023 | Nakamura | H10D 86/60 |
| 2023/0400733 A1* | 12/2023 | Nakamura | G02B 6/0088 |
| 2024/0036372 A1* | 2/2024 | Yang | G02B 6/0063 |
| 2025/0013098 A1* | 1/2025 | Nakamura | G02F 1/133605 |

FOREIGN PATENT DOCUMENTS

JP          2023180535 A     12/2023

* cited by examiner

*Primary Examiner* — Bryon T Gyllstrom
(74) *Attorney, Agent, or Firm* — Maier & Maier, PLLC

(57)          ABSTRACT

According to one embodiment, a display device includes a light guide, a first transparent substrate, a second transparent substrate, a plurality of light-emitting elements disposed along a first direction, a liquid crystal layer containing stripe-like polymers and liquid crystal molecules, and a transparent layer. The transparent layer includes a plurality of strip portions disposed along the first direction, extending in a second direction and having a refractive index lower than that of the second transparent substrate. Each of the strip portions includes a first end portion located on a side facing the light-emitting elements and a linear second end portion opposite to the first end portion.

15 Claims, 8 Drawing Sheets

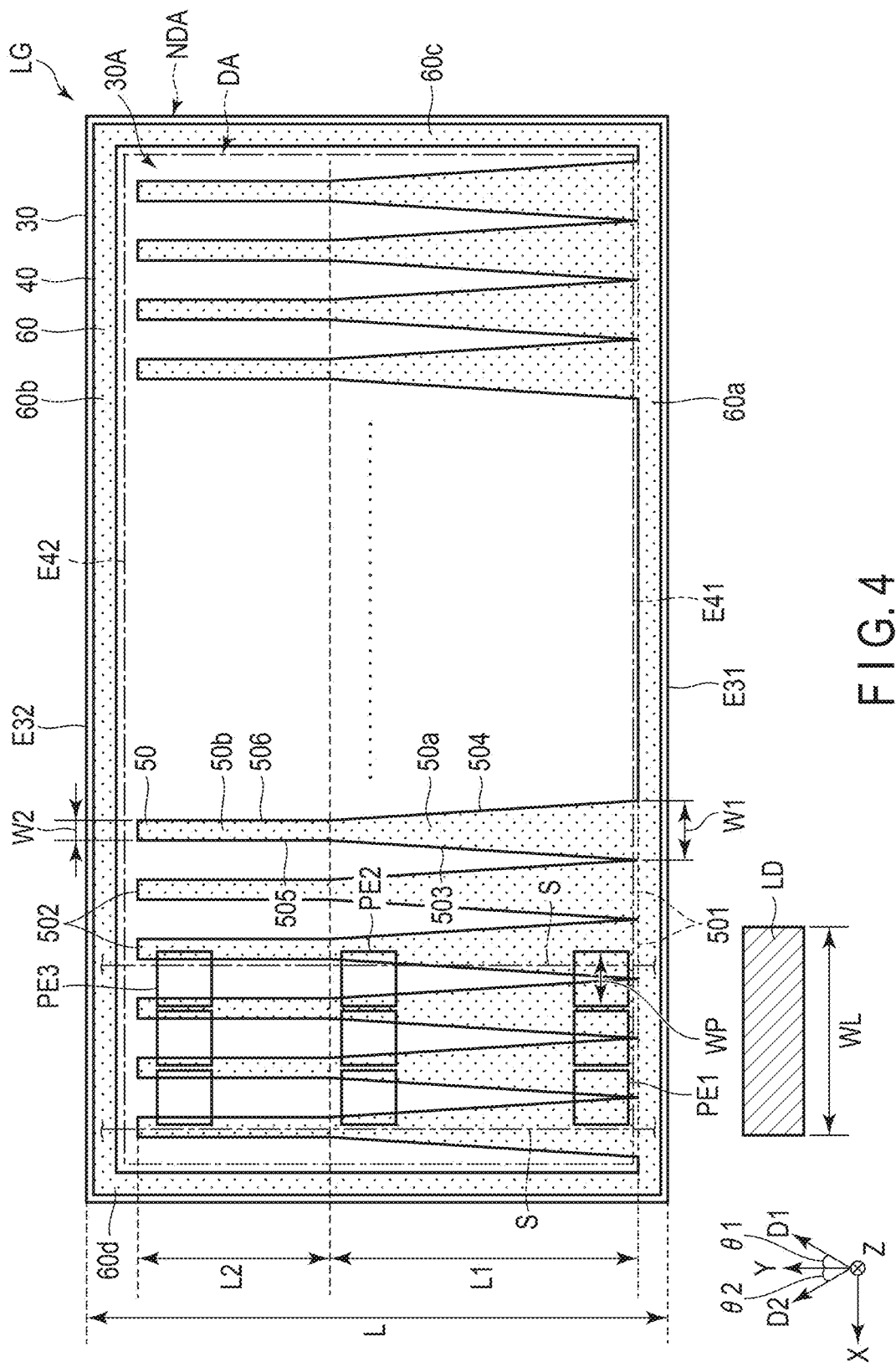
F I G. 4

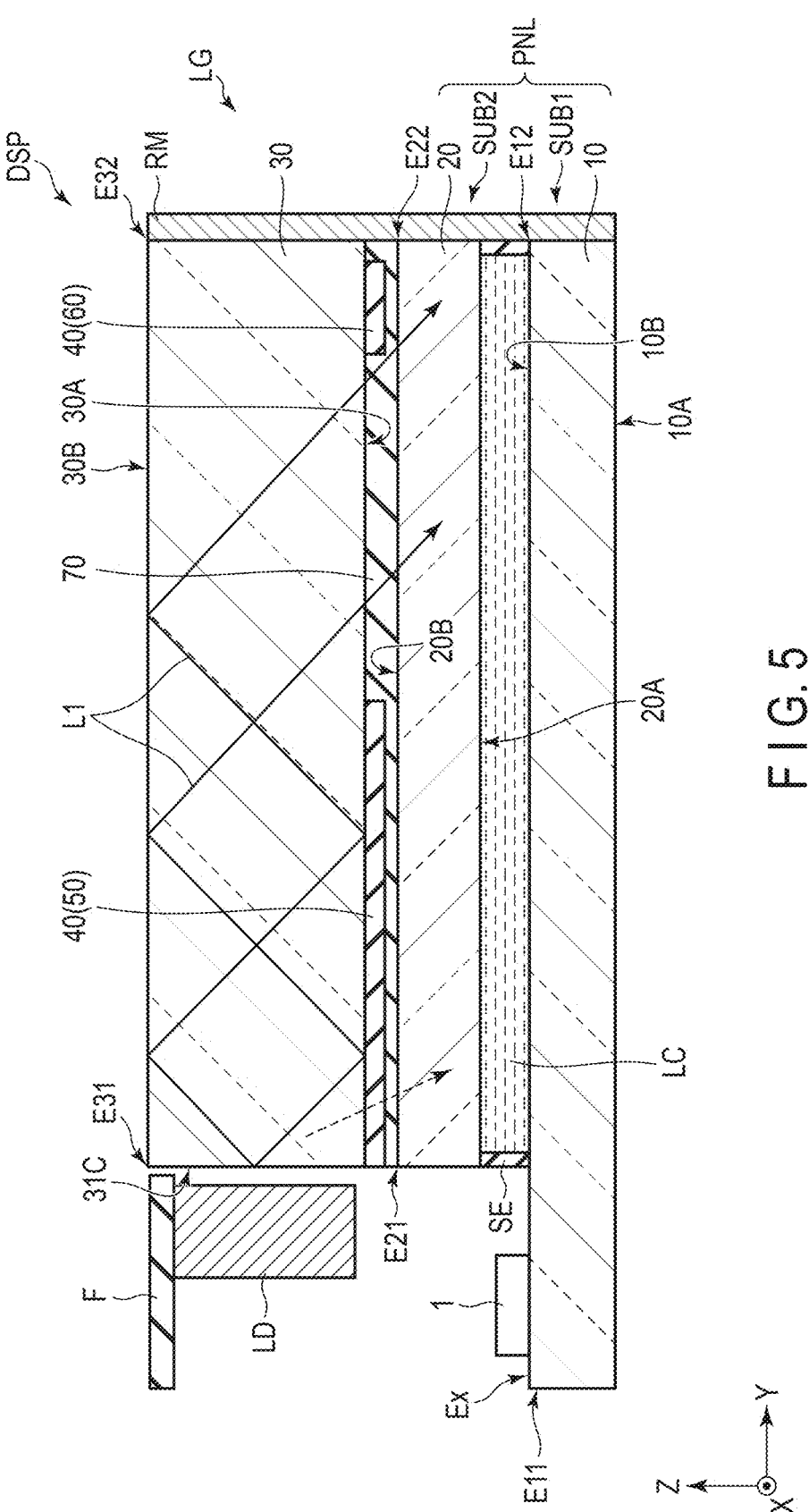
F I G. 5

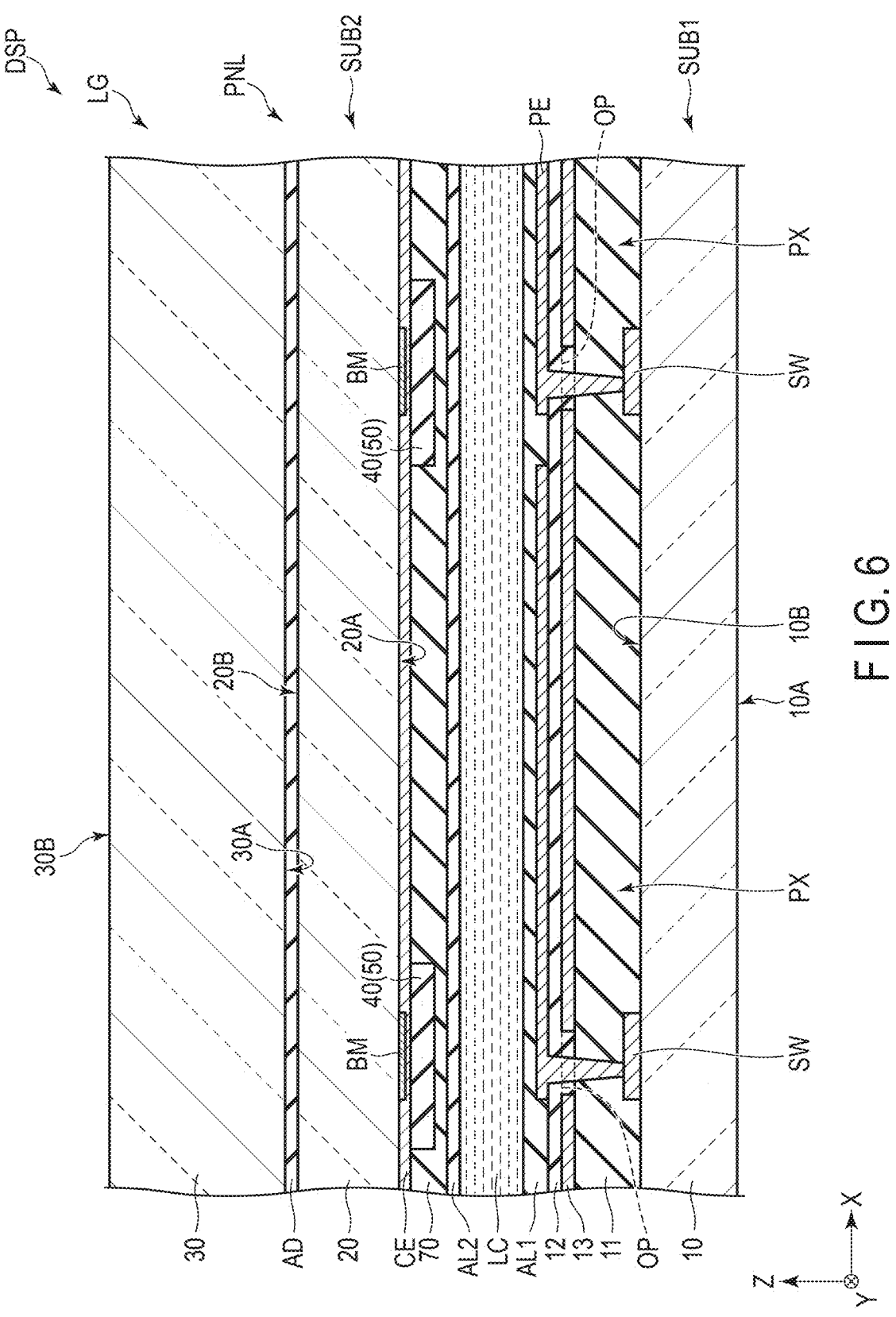
F I G. 6

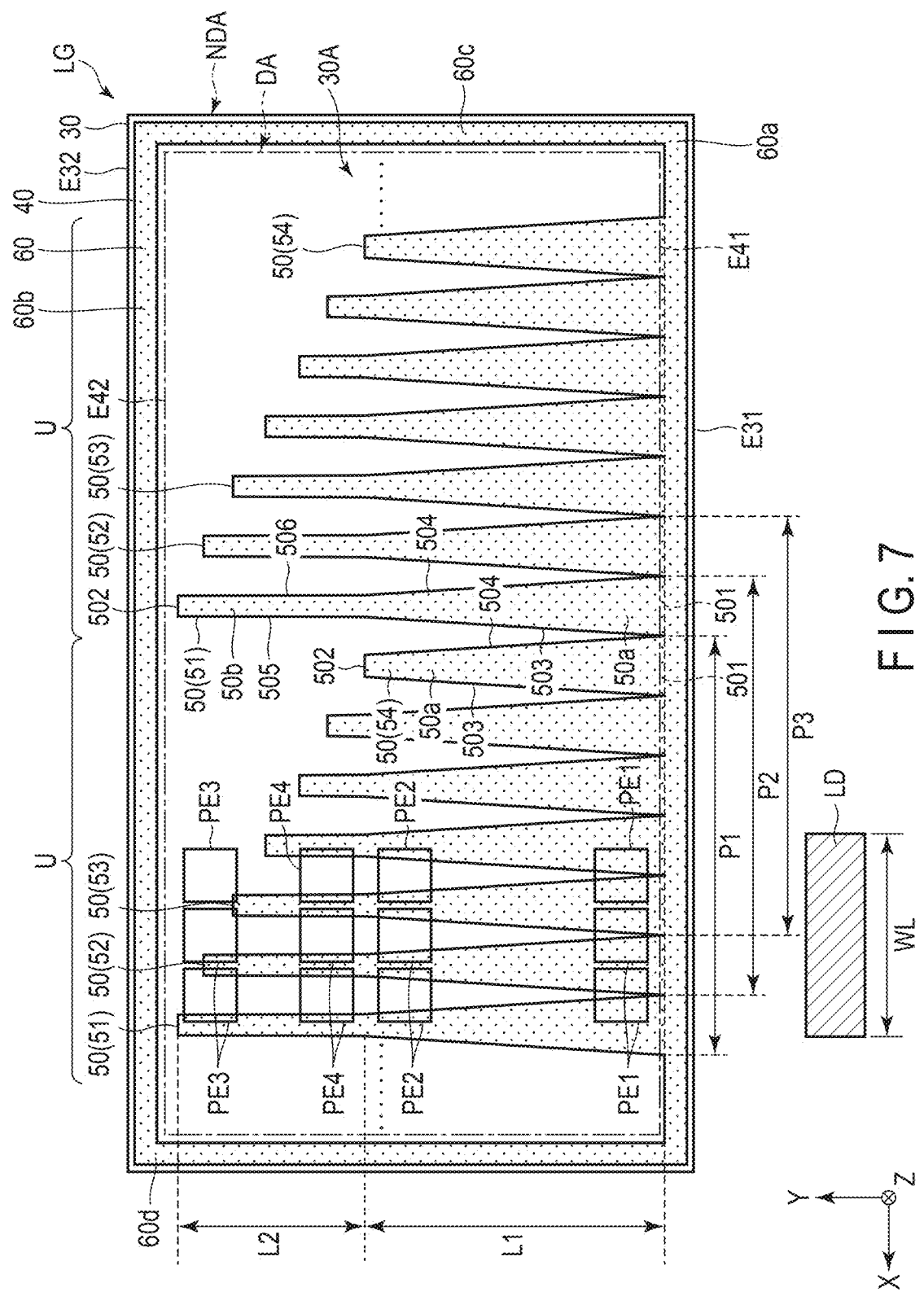
F I G. 7

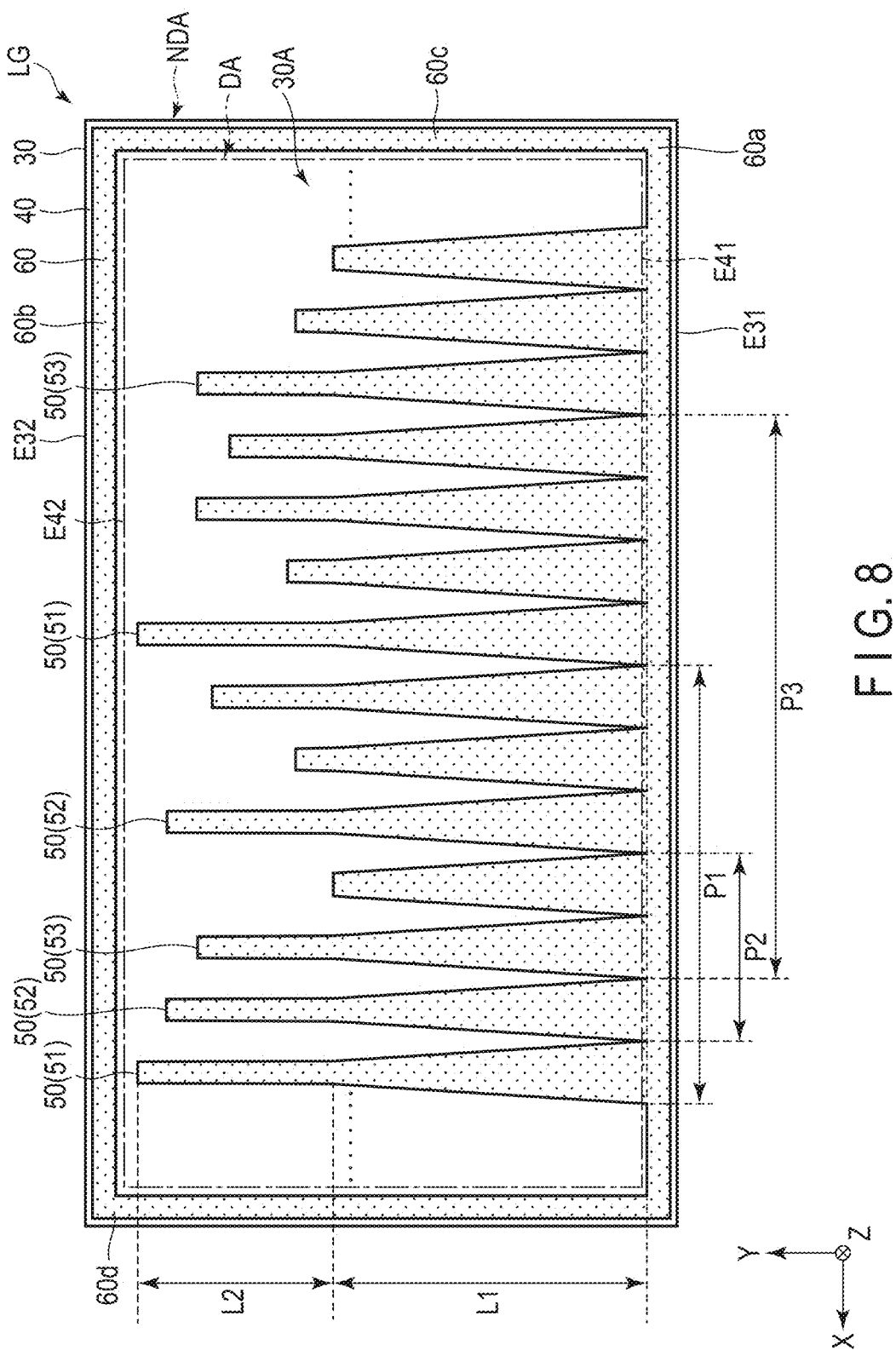
F I G . 8

DISPLAY DEVICE AND ILLUMINATION DEVICE

CROSS-REFERENCE TO RELATED APPLICATIONS

This application is based upon and claims the benefit of priority from Japanese Patent Application No. 2024-124582, filed Jul. 31, 2024, the entire contents of which are incorporated herein by reference.

FIELD

Embodiments described herein relate generally to a display device and an illumination device.

BACKGROUND

Various display devices using polymer-dispersed liquid crystals that can switch between a scattering state that scatters incident light and a transparent state that transmits incident light have been proposed. In some display devices using polymer-dispersed liquid crystals, the edge-light method, in which a light emitting module is arranged at an edge of the display panel, is used. Such display devices have high transmittance, and therefore they are expected to be used in various fields. On the other hand, there is a demand for improvement in the phenomenon in which the brightness decreases as the distance from the light-emitting module increases in such display devices.

BRIEF DESCRIPTION OF THE DRAWINGS

FIG. 4 is a plan view showing a configuration example of a light guide element shown in FIG. 2.

FIG. 5 is a cross-sectional view showing a configuration example of the display device of this embodiment.

FIG. 6 is a cross-sectional view showing another configuration example of the display device shown in FIG. 3.

FIG. 7 is a plan view showing another configuration example of the light guide element shown in FIG. 4.

FIG. 8 is a plan view showing another configuration example of the light guide element shown in FIG. 7.

DETAILED DESCRIPTION

Figure 1:
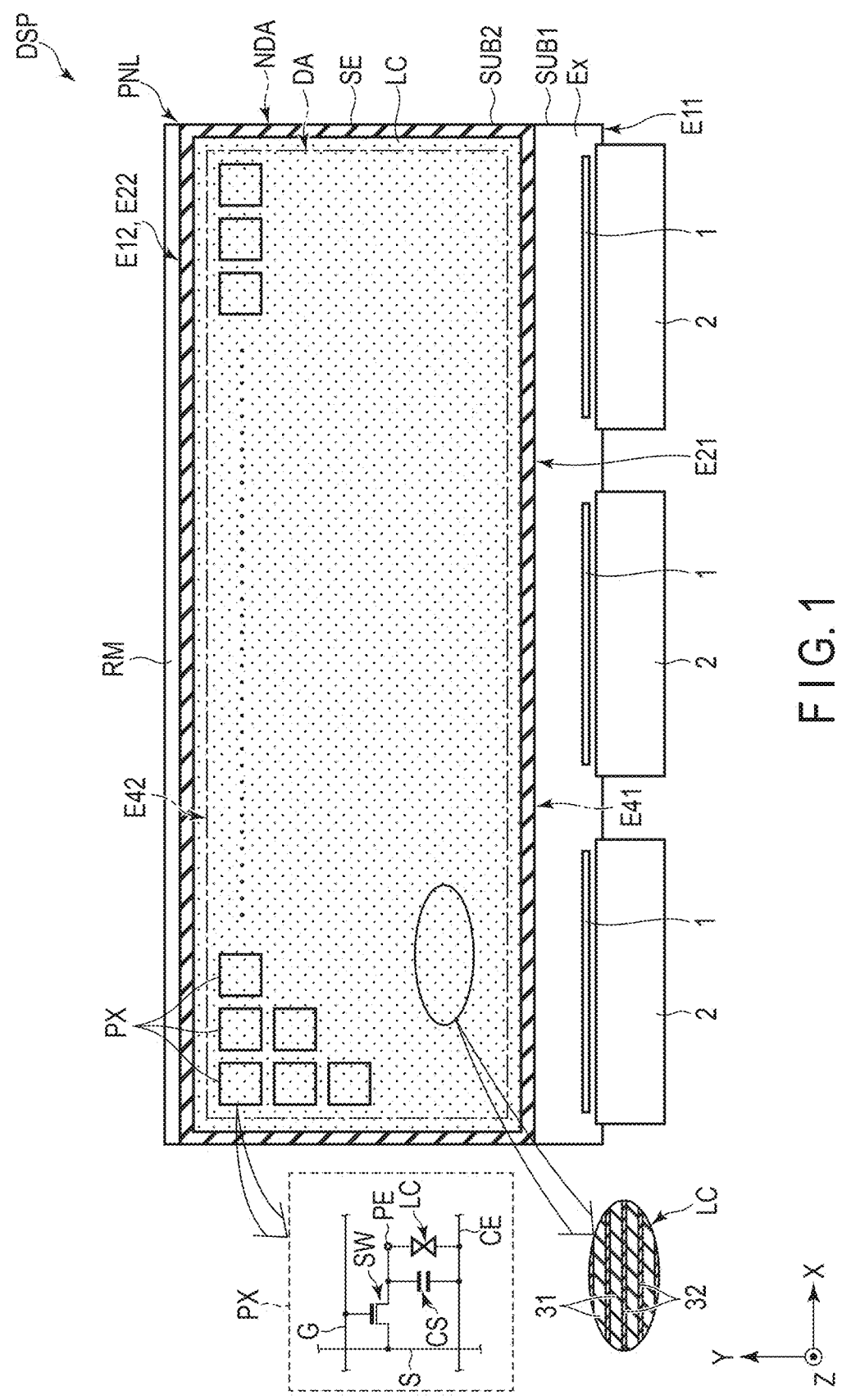
FIG. 1 is a plan view showing a configuration example of a display device according to this embodiment.

In general, according to one embodiment, a display device comprises a light guide, a first transparent substrate, a second transparent substrate, a plurality of light-emitting elements aligned along a first direction, a liquid crystal layer, and a transparent layer. The second transparent substrate is disposed between the first transparent substrate and the light guide. The liquid crystal layer is disposed between the first transparent substrate and the second transparent substrate and containing strip-like polymers and liquid crystal molecules. The transparent layer is disposed between the first transparent substrate and the light guide. The transparent layer comprises a plurality of strip portions arranged along the first direction and extending along a second direction perpendicular to the first direction. The plurality of strip portions have a refractive index lower than that of the second transparent substrate. Each of the plurality of strip portions comprises a first end portion located on a light-emitting element side of the respective strip portion and a linear second end portion on an opposite side to the first end portion. Each of the plurality of strip portions comprises a first portion surrounded by the first end portion and a first edge and a second edge which face each other. The first edge and the second edge extend in directions different from each other.

According to one embodiment, an illumination device comprises a light guide, a plurality of light-emitting elements aligned along a first direction, and a transparent layer. The transparent layer comprises a plurality of strip portions arranged along the first direction and extending along a second direction perpendicular to the first direction. The plurality of strip portions have a lower refractive index than that of the light guide. Each of the plurality of strip portions comprises a first end portion located on a light-emitting element side of the respective strip portion and a linear second end portion on an opposite side to the first end portion. Each of the plurality of strip portions comprises a first portion surrounded by the first end portion and a first edge and a second edge which face each other. The first edge and the second edge extend in directions different from each other.

According to the configurations described above, it is possible to provide a display device and illumination device that can suppress a decrease in display quality, and are easy to manufacture.

The present embodiment will be described hereinafter with reference to the accompanying drawings.

Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

FIG. 1 is a plan view showing a configuration example of a display device DSP of this embodiment. For example, a first direction X, a second direction Y, and a third direction Z are orthogonal to each other, but they may intersect at an angle other than 90 degrees. The first direction X and the second direction Y correspond to directions parallel to a main surface of the substrate that constitutes the display device DSP, and the third direction Z corresponds to the thickness direction of the display device DSP. In this specification, the direction from a first substrate SUB1 towards a second substrate SUB2 is referred to as the "upper side" (or simply "upper" or "above"), and the direction from the second substrate SUB2 towards the first substrate SUB1 is referred to as the "lower side" (or simply "lower" or "below"). Further, with such expressions "a second member above a first member" and "a second member below a first member", the second member may be in contact with the first member or may be remote from the first member. In addition, it is assumed that there is an observation position to observe the display device DSP on a tip side of an arrow indicating the third direction Z, and viewing from this observation position toward the X-Y plane defined by the first direction X and the second direction Y is referred to as plan view.

In this embodiment, as an example of display devices DSP, a liquid crystal display device in which polymer-dispersed liquid crystals are applied will be explained. As shown in FIG. 1, the display device DSP comprises a display panel PNL, an IC chip 1, and a wiring substrate 2.

The display panel PNL comprises a first substrate SUB1, a second substrate SUB2, a liquid crystal layer LC, and a seal SE. The first substrate SUB1 and the second substrate SUB2 are formed into a flat plate shape parallel to the X-Y plane. The first substrate SUB1 and the second substrate SUB2 overlap each other in plan view. The first substrate SUB1 and the second substrate SUB2 are adhered together by the seal SE.

The first substrate SUB1 include an edge portion E11 and an edge portion E12 that extend along the first direction X. The second substrate SUB2 includes an edge portion E21 and an edge portion E22 that extend along the first direction X. Note that the edge portion E11 does not overlap the edge portion E21, and the edge portion E12 overlaps the edge portion E22. The edge portion E21 is located between the edge portion E11 and the edge portion E12 in the second direction Y. The first substrate SUB1 includes an extending portion Ex that extends from the edge portion E21 in the second direction Y. In the example shown in FIG. 1, the extending portion Ex corresponds to a region of the first substrate SUB1, which does not overlap the second substrate SUB2.

The liquid crystal layer LC is disposed between the first substrate SUB1 and the second substrate SUB2 and is sealed by the seal SE. In FIG. 1, the liquid crystal layer LC is indicated by dots, and the seal SE is indicated by diagonal lines.

As shown schematically and enlarged in FIG. 1, the liquid crystal layer LC comprises a polymer-dispersed liquid crystal including polymers 31 and liquid crystal molecules 32. In one example, the polymers 31 are liquid crystal polymers. The polymers 31 are formed into a strip-like shape extending along the first direction X. The liquid crystal molecules 32 are dispersed in the gaps between the polymer 31 and are arranged such that their longitudinal axes are aligned with the first direction X. Each of the polymer 31 and the liquid crystal molecules 32 exhibits optical anisotropy or refractive index anisotropy. The response of the polymers 31 to an electric field is lower than that of the response of the liquid crystal molecules 32 to an electric field.

For example, the alignment direction of the polymers 31 remains substantially unchanged regardless of the presence or absence of an electric field. On the other hand, the alignment direction of the liquid crystal molecules 32 changes in response to an electric field while a voltage of a threshold value or higher is being applied to the liquid crystal layer LC. When no voltage is being applied to the liquid crystal layer LC, the optical axes of the polymers 31 and the liquid crystal molecules 32 are parallel to each other, and the light that enters the liquid crystal layer LC is transmitted therethrough without substantially being scattered in the liquid crystal layer LC (transparent state). When a voltage is being applied to the liquid crystal layer LC, the optical axes of the polymers 31 and the liquid crystal molecules 32 intersect each other, and the light that enters the liquid crystal layer LC is scattered within the liquid crystal layer LC (scattered state).

The display panel PNL comprises a display area DA which displays images and a non-display area NDA surrounding the display area DA in an area where the first substrate SUB1 and the second substrate SUB2 overlap each other in plan view. The seal SE is located in the non-display area NDA. The display area DA comprises pixels PX arranged in a matrix pattern along the first direction X and the second direction Y. The display area DA includes edge portions E41 and E42 that extend along the first direction X. The edge portion E41 is located between the edge portion E21 and the edge portion E42. The edge portion E42 is located between the edge portion E12 and the edge portion E41.

As shown enlarged in FIG. 1, each of the pixels PX comprises a switching element SW, a pixel electrode PE, a common electrode CE, a liquid crystal layer LC, and the like. The switching element SW is constituted, for example, by a thin film transistor (TFT), and electrically connected to a respective scanning line G and a respective signal line S. The scanning lines G each extend along the first direction X and are electrically connected to the switching element SW of each of those pixels PX which are aligned along the first direction X. The signal lines S each extend along the second direction Y and are electrically connected to the switching element SW of each of those pixels PX which are aligned along the second direction Y. The pixel electrodes PE are electrically connected to the switching elements SW, respectively. Each of the pixel electrode PE is disposed to face the common electrode CE, and the liquid crystal layer LC (in particular, liquid crystal molecules 32) is driven by the electric field generated between the pixel electrode PE and the common electrode CE. The capacitor CS is formed between, for example, an electrode at the same potential as that of the common electrode CE and an electrode at the same potential as that of the pixel electrode PE.

The IC chip 1 and the wiring substrate 2 are each connected to the extending portion Ex. The IC chip 1 includes, for example, a display driver that outputs signals necessary for image display. The wiring substrate 2 is a flexible printed circuit board that can be bent. Note that IC chip 1 may as well be connected to the wiring substrate 2. The IC chip 1 and the wiring substrate 2 may read signals from the display panel PNL in some cases, but primarily each function as a signal source which supply signals to the display panel PNL.

In the example shown in FIG. 1, the display device DSP includes a reflective member RM disposed on side surfaces along the edge portions E12 and E22, respectively. The reflective member RM are formed from a high-reflectivity metal material such as aluminum, silver, or titanium. The reflective members RM may be a sheet adhered to the side surfaces or a thin film directly formed on the side surfaces by a method such as vapor deposition.

Figure 2:
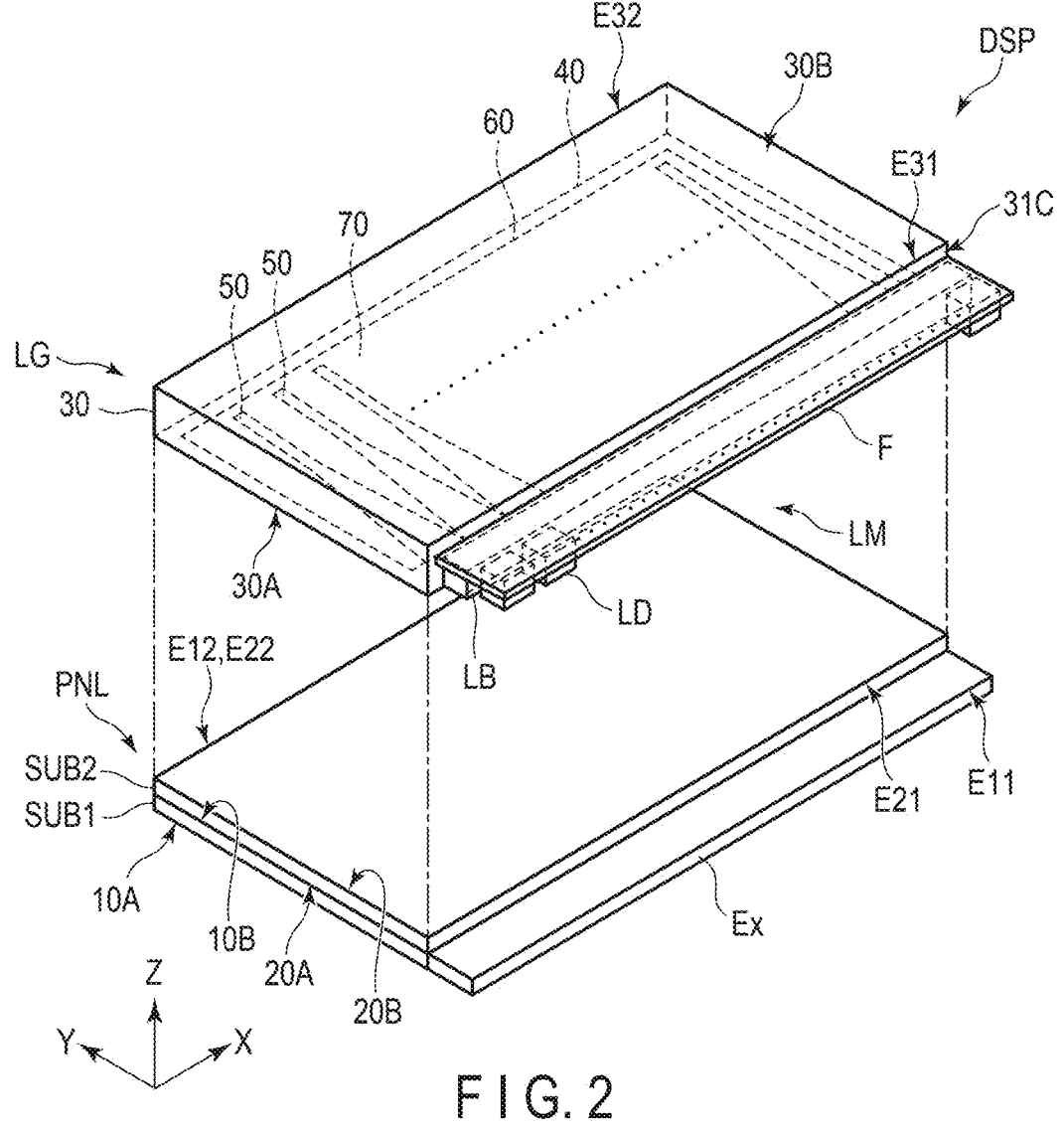
FIG. 2 is an exploded perspective view showing the main parts of the display device shown in FIG. 1.

FIG. 2 is an exploded perspective view of the main parts of the display device DSP shown in FIG. 1.

The display device DSP includes, in addition to the display panel PNL, a light guide element LG and a light-emitting module LM. The first substrate SUB1, the second substrate SUB2, and the light guide element LG are arranged in this order along the third direction Z.

The light guide element LG comprises a transparent substrate 30, a transparent layer 40, and a protective layer 70. The transparent substrate 30 includes an edge portion E31 and an edge portion E32 extending along the first direction X. The edge portion E31 overlaps the edge portion E21 in plan view. The edge portion E32 overlaps the edge portions E12 and E22 in plan view. The transparent substrate 30 further includes a side surface 31C along the edge portion E31. The side surface 31C is a plane that is substantially parallel to the X-Z plane defined by the first direction X and the third direction Z. The side surface 31C is located on a light-emitting element LD side of the transparent substrate 30 in plan view. The side surface 31C faces multiple light-emitting elements LD in the second direction Y.

The light-emitting module LM comprises a plurality of light-emitting elements LD, a light guide body LB and a wiring substrate F. The light-emitting elements LD are arranged at intervals along the first direction X. Each of the light-emitting elements LD is connected to the wiring substrate F. In the example shown in FIG. 2, each of the light-emitting elements LD overlaps the extending portion Ex in plan view. The light-emitting elements LD are, for example, light-emitting diodes. The light-emitting elements LD, which will not be described in detail, though, include red light-emitting units, green light-emitting units, and blue light-emitting units. The light emitted from the light-emitting elements LD progresses in the direction indicated by the arrow pointing the second direction Y. The light guide body LB is formed into a rod-like shape extending in the first direction X and disposed between the light-emitting elements LD and the light guide element LG in the second direction Y.

Figure 3:
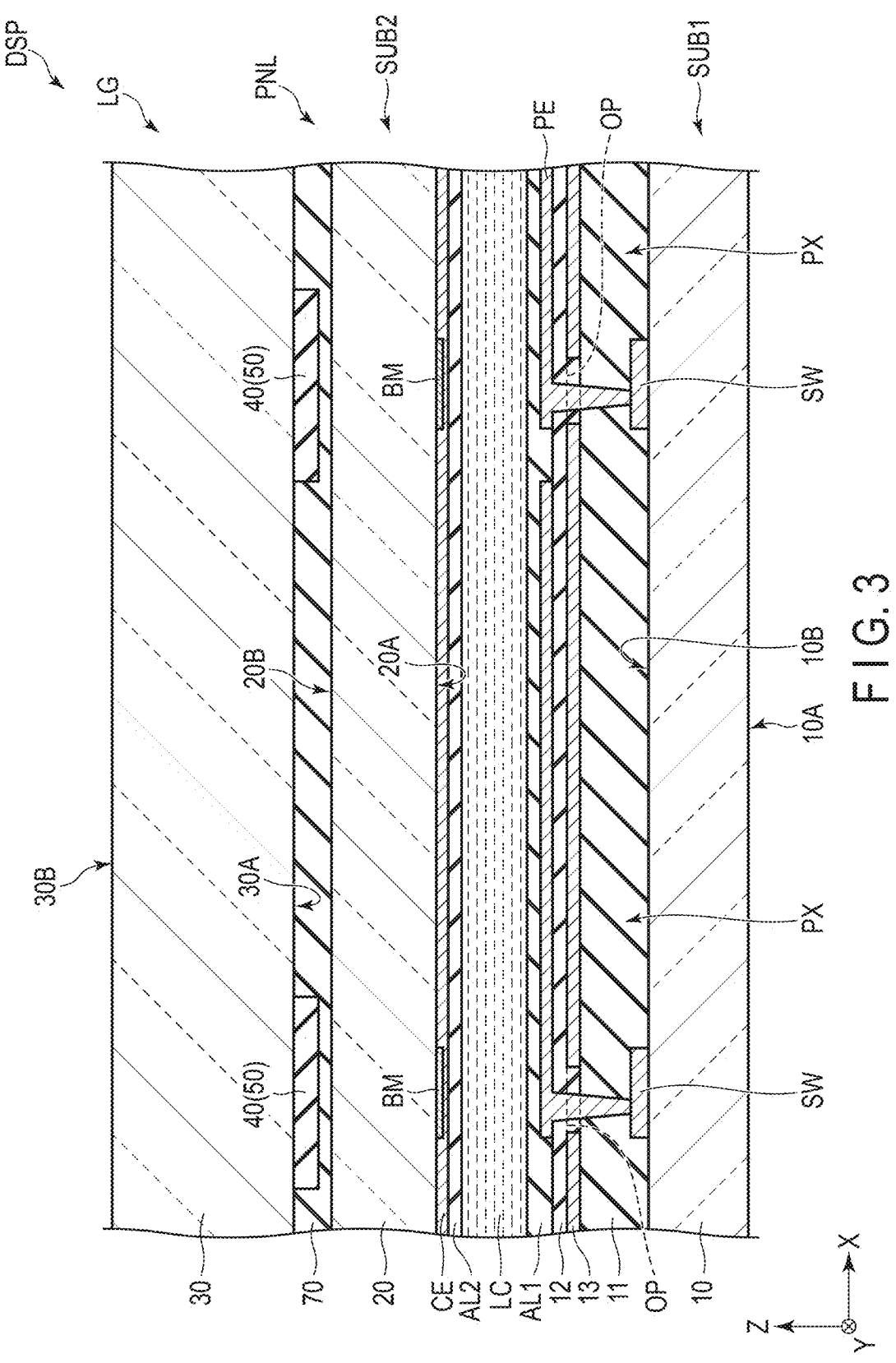
FIG. 3 is a cross-sectional view showing a configuration example of the display device shown in FIG. 1.

FIG. 3 is a cross-sectional view showing a configuration example of the display device DSP shown in FIG. 1. Here, the cross-section of the display area DA on the X-Z plane defined by the first direction X and the third direction Z will be described.

The first substrate SUB1 comprises a transparent substrate 10, insulating layers 11 and 12, a capacitive electrode 13, switching elements SW, pixel electrodes PE, and an alignment film AL1. The first substrate SUB1 further comprises the scanning lines G and signal lines S shown in FIG. 1. The scanning lines G are disposed, for example, between the transparent substrate 10 and the insulating layer 11.

The transparent substrate 10 has a main surface (lower surface) 10A and a main surface (upper surface) 10B on an opposite side to the main surface 10A. The main surfaces 10A and 10B are planes that are substantially parallel to the X-Y plane. The switching elements SW are disposed, for example, on the main surface 10B. The insulating layer 11 covers the switching elements SW and the main surface 10B. The capacitive electrode 13 is disposed between the insulating layers 11 and 12.

The pixel electrodes PE are disposed between the insulating layer 12 and the alignment film AL1, each for each respective pixel PX. The pixel electrodes PE are each electrically connected to the respective switching element SW through an aperture OP of the capacitive electrode 13. The pixel electrodes PE each overlap the capacitive electrode 13 while interposing the insulating layer 12 therebetween, thus forming the capacitor CS of the respective pixel PX. The alignment film AL1 covers the pixel electrodes PE and the insulating layer 12.

The second substrate SUB2 comprises a transparent substrate 20, light-shielding layers BM, a common electrode CE, and an alignment film AL2.

The transparent substrate 20 has a main surface (lower surface) 20A and a main surface (upper surface) 20B on an opposite side to the main surface 20A. The main surfaces 20A and 20B are planes that are substantially parallel to the X-Y plane. The main surface 20A of the transparent substrate 20 faces the main surface 10B of the transparent substrate 10.

The light-shielding layers BM and the common electrode CE are disposed on the main surface 20A. The light-shielding layers BM are located, for example, directly above the switching elements SW, respectively, and overlap the switching elements SW, respectively, in plan view. The light-shielding layer BM may as well be located directly above the signal lines S and scanning lines G (not shown), respectively. The common electrode CE is provided over across multiple pixels PX, so as to face each of the pixel electrodes PE via the liquid crystal layer LC in the third direction Z, and directly cover the light-shielding layers BM. The common electrode CE is electrically connected to the capacitive electrode 13 and is at the same potential as that of the capacitive electrode 13.

The alignment film AL2 covers the common electrode CE. The liquid crystal layer LC is located between the main surface 10B and the main surface 20A and is in contact with the alignment films AL1 and AL2.

The light guide element LG comprises a transparent substrate 30, a transparent layer 40, and a protective layer 70. The transparent substrate 30 has a main surface (lower surface) 30A and a main surface (upper surface) 30B on an opposite side to the main surface 30A. The main surfaces 30A and 30B are planes that are substantially parallel to the X-Y plane. The main surface 30A faces the main surface 20B of the transparent substrate 20.

The transparent layer 40 is disposed between the main surface 30A and the main surface 20B. In the example shown in FIG. 3, the transparent layer 40 is disposed on the main surface 30A. The transparent layer 40 comprises a plurality of strip portions 50 and a frame portion 60 (not shown). The strip portions 50 are arranged at intervals along the first direction X and each extend along the second direction Y. Between each adjacent pair of strip portions 50, the main surface 30A is exposed. The strip portions 50 are located directly above the switching elements SW, respectively, and overlap the switching elements SW, respectively, in plan view. The strip portions 50 may as well be located directly above the signal lines S (not shown) and overlap the signal lines S, respectively, in plan view. The shape of the transparent layer 40 will be described in detail later. The protective layer 70 is disposed between the main surface 30A and the main surface 20B and directly covers transparent layer 40.

In the first substrate SUB1, the switching elements SW, the insulating layers 11 and 12, the capacitive electrode 13, the pixel electrodes PE, and the alignment film AL1 are located between the main surface 10B and the liquid crystal layer LC. In the second substrate SUB2, the light-shielding layers BM, the common electrode CE, and the alignment film AL2 are located between the main surface 20A and the liquid crystal layer LC. In the light-guiding element LG, the transparent layer 40 and the protective layer 70 are located between the main surface 30A and the main surface 20B.

The transparent substrates 10 and 20 are insulating substrates such as of glass substrate or plastic substrate. The transparent substrate 30 is an insulating substrate such as a glass substrate or a plastic substrate formed from polymethyl methacrylate (PMMA) or polycarbonate (PC). The insulating layers 11 and 12 are inorganic insulating films such as silicon oxide, silicon nitride, and silicon oxynitride, or organic insulating films such as of acrylic resin.

The capacitive electrode 13, pixel electrodes PE, and common electrode CE are transparent electrodes formed from a transparent conductive material such as indium tin oxide (ITO) or indium zinc oxide (IZO). The light-shielding layers BM may each be a light-absorbing layer formed from a light-absorbing material or a light-reflecting layer formed from a light-reflecting material. Additionally, the light-shielding layers BM each may as well be an insulating layer formed from an inorganic or organic material, or a conductive layer formed from a metal material.

The alignment films AL1 and AL2 are horizontal alignment films having an alignment restriction force substantially parallel to the X-Y plane. In one example, the alignment films AL1 and AL2 are subjected to alignment treatment along the first direction X. Note that the alignment treatment may be a rubbing treatment or an optical alignment treatment.

The transparent layer 40 is, for example, an insulating layer formed from an organic material such as siloxane-based resin or fluorine-based resin. The protective layer 70 is, for example, an insulating film formed from an organic material or inorganic material.

The transparent substrate 10 has a thickness T1, the transparent substrate 20 has a thickness T2, and the transparent substrate 30 has a thickness T3. Note that the thickness referred to in this specification corresponds to the length along the third direction Z. In the example illustrated, the thickness T1 is equal to the thickness T2, and the thickness T3 is greater than the thickness T1 and thickness T2. Note that the thickness T3 may be equal to thickness T1 and thickness T2.

The transparent substrates 10, 20, 30, and the protective layer 70 have refractive indices n10, n20, n30, and n70, respectively. The transparent layer 40 has a refractive index n40 that is lower than refractive indices n10, n20, n30, and n70. For example, the refractive indices n10, n20, n30, and n70 are approximately 1.5, and the refractive index n40 is 1.0 or more and 1.50 or less. The refractive indices n10, n20, n30, and n70 are equivalent to each other. Here, the expression "equivalent" used here means not only the case where the difference in refractive indices is zero, but also includes cases where the difference in refractive indices is 0.03 or less.

FIG. 4 is a plan view showing an example of the light guide element LG shown in FIG. 2. In FIG. 4, the protective layer 70 is omitted. Further, in FIG. 4, the strip portion 50 is schematically shown while expanding the width along the first direction X. Further, in FIG. 4, the region of the light guide element LG, which overlaps the display area DA when it is overlaid on the display panel PNL shown in FIG. 2 is indicated by alternate long and short dashed lines.

The transparent layer 40 comprises a plurality of strip portions 50 and a frame portion 60. The strip portions 50 are arranged at intervals along the first direction X and extend along the second direction Y.

Each of the strip portions 50 comprises a first end portion 501 located on a light-emitting element LD side of the strip portion 50 and a second end portion 502 located on an opposite side to the first end portion 501. Each of the first end portions 501 is disposed on the same straight line along the first direction X. In the example shown in FIG. 4, each of the first end portions 501 is located between the edge portion E31 and the edge portion E41 in plan view (that is, the region overlapping the non-display area NDA in plan view), but the configuration is not limited to this.

Each of the second end portions 502 is arranged on the same straight line along the first direction X. In the example shown in FIG. 4, the second end portions 502 are located between the edge portion E41 and the edge portion E42 (that is, the region overlapping the display area DA in plan view), but the configuration is not limited to this. The second end portions 502 are formed in a straight line. In the example shown in FIG. 4, the second end portions 502 are formed in a straight line along the first direction X.

The first end portions 501 and the second end portions 502 have a first width W1 and a second width W2, respectively. Note that the term "width" referred to in this specification corresponds to the length along the first direction X. The first width W1 is greater than the second width W2. In one example, the first width W1 is less than the width WL of a single light-emitting element LD, and a single light-emitting element LD is disposed over across multiple strip portions 50 aligned along the first direction X. Additionally, the first width W1 is equal to or less than the width WP of a single pixel electrode PE (or the pitch of pixel electrodes PE disposed along the first direction X). For all the strip portions 50, the first width W1 is substantially the same. Additionally, for all the strip portions 50, the second width W2 is substantially the same as well.

The strip portions 50 each further comprises a first edge 503, a second edge 504, a third edge 505, and a fourth edge 506. The first edge 503 and the second edge 504 face each other. The third edge 505 and the fourth edge 506 face each other. The first edge 503 and the second edge 504 are disposed between the light-emitting element LD and the third edge 505 and the fourth edge 506.

The first edge 503 and the second edge 504 are each connected to the first end portion 501, and the third edge 505 and the fourth edge 506 are each connected to the second end portion 502. Further, the first edge 503 is connected to the third edge 505, and the second edge 504 is connected to the fourth edge 506.

The strip portion 50 comprises a first portion 50a surrounded by the first end portion 501, the first edge 503, and the second edge 504. The strip portion 50 further comprises a second portion 50b surrounded by the second end portion 502, the third edge 505, and the fourth edge 506. The first portion 50a is disposed between the second portion 50b and the light-emitting element LD. The first portion 50a is connected to the second portion 50b.

The first edge 503 and the second edge 504 extend in directions different from each other between the first end portion 501 and the second portion 50b and are non-parallel. Each of the first edge 503 and the second edge 504 extends in a direction different from, for example, the first direction X and the second direction Y. For example, the direction that intersects the second direction Y at an acute angle in a clockwise direction is defined as a direction D1, and the direction that intersects the second direction Y at an acute angle in a counterclockwise direction is defined as a direction D2. In the example shown in FIG. 4, the angle θ1 made between the second direction Y and the direction D1, and the angle θ2 made between the second direction Y and the direction D2 are identical to each other, but the configuration is not limited to this. The angle θ1 made between the second direction Y and the direction D1, and the angle θ2 made between the second direction Y and the direction D2 may be different from each other. For example, the first edge 503 extends along the direction D1, and the second edge 504 extends along the direction D2. In the example shown in FIG. 4, the first edge 503 and the second edge 504 both extend linearly, but they may as well be formed into a curved shape.

The third edge 505 and the fourth edge 506 extend in the same direction between the first portion 50a and the second end portion 502 and are parallel to each other. In the example shown in FIG. 4, the third edge 505 and the fourth edge 506 each extend along the second direction Y.

The first width W1 corresponds to the interval between the first edge 503 and the second edge 504 along the first direction X, and the second width W2 corresponds to the interval between the third edge 505 and the fourth edge 506 along the first direction X.

From another perspective, the first portion 50a has an approximately trapezoidal shape constituted by the first end portion 501 as one base and the first edge 503 and the second edge 504 as two sides, and the second portion 50b has an approximately rectangular shape constituted by the second end portion 502, the third edge 505, and the fourth edge 506 as three sides.

In the strip portion 50 of such a shape, the first portion 50a has a width that gradually decreases at a constant ratio or at an arbitrary ratio as the location is farther away from the first end portion 501 in the second direction Y. In other words, the distance between the first edge 503 and the second edge 504 along the first direction X decreases as the location is distant away more from the light-emitting element LD in the second direction Y. On the other hand, the second portion 50b has a substantially constant width along the second direction Y. That is, the distance along the first direction X between the third edge 505 and the fourth edge 506 remains substantially constant along the second direction Y. The strip portions 50 are located at equal distances along the second direction Y from the edge portion E31 and have the same width along the first direction X.

In the example shown in FIG. 4, the length L1 of the first portion 50a along the second direction Y is greater than the length L2 of the second portion 50b along the second direction Y, but the configuration is not limited to this. When the distance in the second direction Y from the edge portion E31 to the edge portion E32 is denoted as L, the first portion 50a extends, for example, by approximately half to three-quarters of the distance L.

The pitch of each adjacent pair of strip portions 50 should preferably two times or less the width WP of the pixel electrode PE (or the pitch of pixel electrodes PE disposed along the first direction X). In the example shown in FIG. 4, a single pixel electrode PE overlaps two adjacent strip portions 50 in plan view. The pixel electrodes PE overlap the main surface 30A of the transparent substrate 30 between each adjacent pair of strip portions 50.

When the pitch of each adjacent pair of strip portions 50 and the pitch of each adjacent pair of signal lines S are the same as each other, moire patterns may occur. In order to avoid this, it is desirable that the pitch of each adjacent pair of strip portions 50 be different from the pitch of each adjacent pair of signal lines S. In FIG. 4, the signal lines S that overlap the transparent substrate 30 when the light guide element LG is overlaid on the display panel PNL shown in FIG. 2 are indicated by alternate long and short dashed lines. The signal lines S are disposed to be aligned at intervals along the first direction X and extend along the second direction Y. As shown, the pitch of each adjacent pair of strip portions 50 is less than the pitch of each adjacent pair of signal lines S, for example.

The frame portion 60 has a frame-like structure surrounding the strip portions 50. The frame portion 60 includes a first portion 60a and a second portion 60b extending along the first direction X, and a third portion 60c and a fourth portion 60d extending along the second direction Y. The first portion 60a and the second portion 60b face each other in the second direction Y. The third portion 60c and the fourth portion 60d face each other in the first direction X.

For example, the first portion 60a is located between the edge portion E31 and the edge portion E41, and the second portion 60b is located between the edge portion E32 and the edge portion E42. In the example shown in FIG. 4, each of the first end portions 501 of the strip portions 50 is connected to the first portion 60a, and each of the second end portions 502 of the strip portions 50 is spaced apart from the second portion 60b in the second direction Y. The strip portions 50 and the frame portion 60 are, for example, formed to be integrated as one body from the same material.

When the light guide element LG overlaps the display panel PNL shown in FIG. 2, the strip portions 50 overlap the display area DA, and the frame portion 60 overlaps the non-display area NDA. The display area DA overlaps the inner side of the frame portion 60.

In the display area DA, let us focus, among the pixel electrodes that overlap the first portions 50a of the strip portions 50, on the pixel electrode PE1, which is closest to the light-emitting element LD, and the pixel electrode PE2, which is farthest from the light-emitting element LD. The area where the pixel electrode PE1 overlaps the transparent layer 40 is greater than the area where the pixel electrode PE2 overlaps the transparent layer 40. In other words, the area where the main surface 30A and the pixel electrode PE1 overlap each other without the transparent layer 40 intervening therebetween is less than the area where the main surface 30A and the pixel electrode PE2 overlap without the transparent layer 40 intervening therebetween.

Further, in the display area DA, let us focus on the pixel electrode PE2 and the pixel electrode PE3, which is farthest away from the light-emitting element LD. The area where the pixel electrode PE2 overlaps the transparent layer 40 is greater than the area where the pixel electrode PE3 overlaps the transparent layer 40. In other words, the area where the main surface 30A and the pixel electrode PE2 overlap each other without the transparent layer 40 intervening therebetween is less than the area where the main surface 30A and the pixel electrode PE3 overlap without the transparent layer 40 intervening therebetween.

As described above, in the region close to the light-emitting element LD, the area where the pixel electrode PE overlaps with the transparent layer 40 is greater as compared to that of the region far away from the light-emitting element LD.

As will be described later, the region overlapping the transparent layer 40 corresponds to the region where light from the light-emitting element LD does not substantially enter the display panel PNL, whereas the region overlapping the main surface 30A without the transparent layer 40 intervening therebetween corresponds to the region where light from the light-emitting element LD can enter the display panel PNL.

FIG. 5 is a cross-sectional view showing an example configuration of the display device DSP shown in FIG. 1. Note that as to the display panel PNL, only the main parts are shown. With reference to FIG. 5, the light emitted from the light-emitting element LD will be explained.

The light-emitting element LD emits light L1 toward the side surface 31C. The light L1 emitted from the light-emitting element LD is refracted at the side surface 31C and enters the transparent substrate 30. Of the light L1 having entered the transparent substrate 30, a portion of the light progressing toward the transparent layer 40 from the transparent substrate 30 is reflected at the interface between the transparent substrate 30 and the transparent layer 40 and does not reach the second substrate SUB2, the liquid crystal layer LC, and the first substrate SUB1. Further, of the light progressing from the transparent substrate 30 toward the transparent layer 40, light having an incident angle less than the critical angle passes through the transparent layer 40, as indicated by the broken line, and reaches the liquid crystal layer LC.

Furthermore, of the light L1 having entered the transparent substrate 30, the light progressing toward the main surface 30B is reflected at the interface between the transparent substrate 30 and the air layer. As described above, most of the light L1 progresses inside the transparent substrate 30 while being repeatedly reflected in the vicinity of the side surface 31C (or in the region where the transparent layer 40 is located). Of the progressing light L1, the light progressing toward the region where the transparent layer 40 is not located, that is, the region where the transparent substrate 30 and the protective layer 70 are in contact with each other, passes through the transparent substrate 30 and passes through the transparent substrate 20 via the protective layer 70.

In the liquid crystal layer LC of the pixel to which voltage is being applied, the light L1 is scattered. On the other hand, in the liquid crystal layer LC of the pixel to which no voltage is being applied, the light L1 passes therethrough.

As shown in the example in FIG. 5, when the reflective member RM is provided on the opposite side to the light-emitting element LD, for example, the light L1 that has reached the side surface on the opposite side to the side surface 31C is reflected toward the display area by the reflective member RM. As a result, leakage of light from the side surface on the opposite side to the side surface 31C is prevented, and the utilization efficiency of the light L1 can be improved compared to the case where the reflective member RM is not provided.

Note that in this embodiment, the light guide element LG and the light-emitting module LM can be regarded as an illumination device that illuminates the display panel PNL. That is, the display device DSP comprises a display panel PNL and an illumination device that faces the display panel PNL in the third direction Z.

As described with reference to FIG. 4, in the region close to the light-emitting element LD, the overlapping area between the pixel electrode PE and the transparent layer 40 is greater as compared to that of the region far away from the light-emitting element LD. Therefore, in the region close to the light-emitting element LD, the entering of the light L1 into the pixel electrode PE is suppressed, whereas in the region far away from the light-emitting element LD, the entering of the light L1 into the pixel electrode PE is promoted. Note that in the region close to the light-emitting element LD, the light L1 does not completely enter the display panel PNL, but as shown in FIG. 4, the light L1 enters the display panel PNL through the gaps in the adjacent strip portions 50, and light having an incident angle that do not satisfy the total internal reflection condition also enters the display panel PNL. In regions equidistant from the light-emitting element LD, the overlapping area between the respective pixel electrode PE and the transparent layer 40 is the same. Therefore, in regions equidistant from the light-emitting element LD, the light L1 enters the pixel electrodes PE each to the same extent.

Of the light having entered the liquid crystal layer LC, the light progressing toward the transparent layer 40 is reflected at the interface between the transparent substrate 30 and the transparent layer 40. The light L1 having entered the liquid crystal layer LC passes through the pixels in transparent state and is scattered at the pixels which are in a scattering state. The display device DSP is observable from the main surface 10A side as well as from the main surface 30B side. Further, the display device DSP is a so-called transparent display, and regardless of when observed from the main surface 10A side or from the main surface 30B side, the background of the display device DSP can be monitored through the display device DSP.

According to this embodiment, it is possible to suppress non-uniformity in the brightness of the display panel PNL.

Focusing on the brightness distribution of the light L1 from the light-emitting element LD, there is a tendency for brightness to decrease in regions far away from the light-emitting element LD. One cause of such a decrease in brightness is undesired absorption and scattering of the light L1 by the liquid crystal layer LC, switching element SW, signal line S, various insulating films, and the like.

The region where the transparent layer 40 overlaps the pixel electrode PE corresponds to the region where the light L1 from the light-emitting element LD does not substantially enter the display panel PNL, whereas the region where the transparent layer 40 does not overlap the pixel electrode PE (or the region between each adjacent pair of strip portions 50) corresponds to the region where the light L1 from the light-emitting element LD enters the display panel PNL.

In regions close to the light-emitting element LD, the overlapping area of the transparent layer 40 per pixel electrode PE is greater as compared to that of the region far away from the light-emitting element LD. Therefore, in the region close to the light-emitting element LD, the entering of light L1 into the display panel PNL is suppressed, and the absorption and scattering of light L1 by the liquid crystal layer LC, switching element SW, signal lines S, various insulating films and the like are suppressed. On the other hand, in regions far away from the light-emitting element LD, the entering of light L1 into the display panel PNL is promoted. As described above, light from the light-emitting element LD attenuates as the location is farther away from the light-emitting element LD.

The overlapping area between the pixel electrode PE1 and the transparent layer 40 shown in FIG. 4 is greater than the overlapping area between the pixel electrode PE2 and the transparent layer 40. Therefore, the area where light L1 can enter the pixel electrode PE1 is less than the area where light L1 can enter the pixel electrode PE2. On the other hand, the intensity of light entering the pixel electrode PE1 is higher than the intensity of light entering the pixel electrode PE2. Therefore, the brightnesses on the display panel PNL at the pixel electrode PE1 and pixel electrode PE2 can be equalized.

Further, the overlapping area between the pixel electrode PE2 and the transparent layer 40 shown in FIG. 4 is greater than the overlapping area between the pixel electrode PE3 and the transparent layer 40. Therefore, the area where the light L1 can enter the pixel electrode PE2 is less than the area where the light L1 can enter the pixel electrode PE3. On the other hand, the intensity of light entering the pixel electrode PE2 is higher than the intensity of light entering the pixel electrode PE3. Therefore, the brightnesses on the display panel PNL at the pixel electrode PE2 and pixel electrode PE3 can be equalized.

Thus, according to this embodiment, it is possible to suppress non-uniformity in the brightness of the display panel PNL. Therefore, a decrease in the display quality of images displayed on the display panel PNL can be suppressed.

When the second width W2 of the second end portion 502 of the strip portion 50 is extremely small, it may be difficult to form the strip portion 50 in the manufacture of the display device DSP.

In the strip portion 50 shown in FIG. 4, the second end portion 502 is formed in a straight line. Each of the strip portions 50 includes a first portion 50a surrounded by a first end portion 501 and a first edge 503 and a second edge 504 facing each other. Each of the strip portions 50 further includes a second portion 50b surrounded by a second end portion 502 and a third edge 505 and a fourth edge 506 facing parallel to each other. The first edge 503 and the second edge 504 extend in directions different from each other. The third edge 505 and the fourth edge 506 extend in the same direction and are parallel to each other. With such a shape of the strip portion 50, the second width W2 of the second end portion 502 is kept at a certain size or larger while equalizing the brightness of the display panel PNL. Therefore, it is possible to suppress the forming of the strip portions 50 from becoming difficult.

As described above, according to this embodiment, it is possible to suppress a decrease in the display quality of images displayed on the display panel PNL and provide a display device DSP that is easy to manufacture.

FIG. 6 is a plan view showing another configuration example of the display device DSP shown in FIG. 3. The configuration example shown in FIG. 6 is different from the configuration example shown in FIG. 3 in that the second substrate SUB2 comprises transparent layer 40, and the light guide element LG does not comprise a transparent layer 40.

The second substrate SUB2 comprises a transparent substrate 20, light-shielding layers BM, a common electrode CE, a transparent layer 40, a protective layer 70, and an alignment film AL2.

The light-shielding layers BM and the common electrode CE are disposed on the main surface 20A. The common electrode CE is disposed over across multiple pixels PX, faces each of the pixel electrodes PE via the liquid crystal layer LC in the third direction Z, and directly covers the light-shielding layers BM.

The transparent layer 40 is disposed between the main surface 20A and the alignment film AL2. In the example shown in FIG. 6, the transparent layer 40 is disposed between the common electrode CE and the protective layer 70, and is formed on the surface of the common electrode CE, which faces the liquid crystal layer LC. The transparent layer 40 comprises multiple strip portions 50 and a frame portion 60 (not shown).

The protective layer 70 is disposed between the common electrode CE and the alignment film AL2, and covers the transparent layer 40. The alignment film AL2 covers the protective layer 70. The main surface 20B and the main surface 30A are adhered to each other, for example, by a transparent adhesive layer AD.

In this configuration example as well, advantageous effects similar to those of the configuration example of FIG. 3 can be obtained.

FIG. 7 is a plan view showing another configuration example of the light guide element LG shown in FIG. 4. In FIG. 7, the protective layer 70 is omitted. Further, in FIG. 7, the strip portions 50 are schematically illustrated with the width along the first direction X expanded. Furthermore, in FIG. 7, the region of the light guide element LG, which overlaps the display area DA when it is overlaid on the display panel PNL shown in FIG. 2 is indicated by alternate long and short dashed lines.

The configuration example shown in FIG. 7 is different from the configuration example shown in FIG. 2 in that the transparent layer 40 comprises multiple strip portions 50 having different lengths along the second direction Y.

In the example shown in FIG. 7, when seven strip portions 50 sequentially disposed along the first direction X are taken as a repeating unit U, then within one repeating unit U, among the strip portions 50 along the second direction Y, the strip portion 51 closest to the fourth portion 60d of the frame portion 60 has the maximum length, and the strip portion 54 farthest from the fourth portion 60d has the minimum length. Further, between the strip portion 51 and the strip portion 54, the length along the second direction Y gradually becomes shorter among the strip portions 50.

For example, among the lengths L2 along the second direction Y of the second portions 50b of the strip portions 50, the length is at the maximum in the strip portion 51, and is at the minimum in the strip portion 54, and the length gradually becomes shorter between the strip portion 51 and the strip portion 54. The first portions 50a of the strip portions 50 along the second direction Y have a length L1 that is the same for all strip portions 50.

In the example shown in FIG. 7, the strip portion 54 comprises a first portion 50a surrounded by a first end portion 501, a first edge 503, a second edge 504, and a second end portion 502, and does not comprise a second portion 50b. Note that the strip portion 54 may as well comprise a second portion 50b.

In the example shown in FIG. 7, seven strip portions 50 sequentially disposed along the first direction X are defined as a single repeating unit U, but the number of strip portions 50 included in a single repeating unit U is not particularly limited as long as it is two or more. For example, a single repeating unit U may include ten strip portions 50 sequentially disposed along the first direction X.

Note that as to the lengths L2 of the strip portions 50 along the second direction Y, the strip portion 51 may have the minimum length, and the strip portion 54 may have the maximum length, and the length L2 may become gradually longer among from the strip portion 51 to the strip portion 54.

Here, let us focus on the strip portion 51, the strip portion 52 adjacent to the strip portion 51 along the first direction X, and the strip portion 53 adjacent to the strip portion 52 along the first direction X. The strip portions 51, 52, and 53 are disposed in this order along the first direction X. The transparent layer 40 includes multiple strip portions 51, 52, and 53. The multiple strip portions 51 are disposed along the first direction X at a pitch P1. The multiple strip portions 52 are disposed along the first direction X at a pitch P2. The multiple strip portions 53 are disposed along the first direction X at a pitch P3. The pitches P1, P2, and P3 are substantially the same as each other.

In the display area DA, among the pixel electrodes that overlap the first portions 50a of the strip portions 50, the multiple pixel electrodes PE1 that are closest to the light-emitting elements LD and the multiple pixel electrodes PE2 that are farthest from the light-emitting elements LD are focused. The area where the multiple pixel electrodes PEL overlap the transparent layer 40 is greater than the area where the multiple pixel electrodes PE2 overlap the transparent layer 40. In other words, the area where the main surface 30A and the multiple pixel electrodes PE1 overlap without the transparent layer 40 intervening therebetween is less than the area where the main surface 30A and the multiple pixel electrodes PE2 overlap without the transparent layer 40 intervening therebetween.

Further, in the display area DA, the multiple pixel electrodes PE2 and the multiple pixel electrodes PE3 that are most distant from the light-emitting elements LD are focused. The area where the multiple pixel electrodes PE2 overlap the transparent layer 40 is greater than the area where the multiple pixel electrodes PE3 overlap the transparent layer 40. In other words, the area where the main surface 30A and the multiple pixel electrodes PE2 overlap without the transparent layer 40 intervening therebetween is less than the area where the main surface 30A and the multiple pixel electrodes PE3 overlap without the transparent layer 40 intervening therebetween.

Furthermore, in the display area DA, the pixel electrodes PE3 and the multiple pixel electrodes PE4 located between the pixel electrodes PE2 and the pixel electrodes PE3, respectively, are focused. The area where the multiple pixel electrodes PE4 overlap the transparent layer 40 is greater than the area where the multiple pixel electrodes PE3 overlap the transparent layer 40. In other words, the area where the main surface 30A and the multiple pixel electrodes PE4 overlap without the transparent layer 40 intervening therebetween is less than the area where the main surface 30A and the multiple pixel electrodes PE3 overlap without the transparent layer 40 intervening therebetween.

As described above, in the region close to the light-emitting element LD, the area where the multiple pixel electrodes PE overlap the transparent layer 40 is greater as compared to that of the region far away from the light-emitting element LD.

In a display device DSP comprising a transparent layer 40 including a plurality of strip portions 50, when the second end portions 502 are each disposed on the same straight line along the first direction X, the area of the region overlapping the transparent layer 40 becomes abruptly smaller in the region from the straight line to the edge portion E42 as compared to that of the region from the edge portion E41 to the straight line. With this configuration, the brightness changes significantly between these regions, and therefore the display quality of the display device DSP may be reduced.

The multiple strip portions 50 have lengths in the second direction Y that are different from each other, and the distances from the second end portions 502 to the edge portion E42 are different from each other. With this configuration, from the region close to the edge portion E41 to the region away from the edge portion E41 and close to the edge portion E42, the area overlapping the transparent layer 40 can be gradually reduced, thereby making it possible to suppress the abrupt change in brightness. As described above, with the configuration example shown in FIG. 7, the degradation of the display quality of images displayed on the display panel PNL can be more effectively suppressed. Further, in this configuration example as well, advantageous effects similar to those of the configuration example illustrated in FIG. 2 can be obtained.

FIG. 8 is a plan view showing another configuration example of the light guide element LG illustrated in FIG. 7. In FIG. 8, the protective layer 70 is omitted. Further, in FIG. 8, the strip portions 50 are schematically illustrated with the width along the first direction X expanded. Furthermore, in FIG. 8, the region of the light guide element LG, which overlaps the display area DA when it is overlaid on the display panel PNL shown in FIG. 2 is indicated by alternate long and short dashed lines.

The configuration example shown in FIG. 8 is different from the configuration example shown in FIG. 7 in that the multiple strip portions 50 having different lengths along the second direction Y are disposed at random along the first direction X.

Here, the strip portion 51, the strip portion 52 adjacent to the strip portion 51 in the first direction X, and the strip portion 53 adjacent to the strip portion 52 in the first direction X will be focused. The multiple strip portions 51 are aligned along the first direction X at a pitch P1. The multiple strip portions 52 are aligned along the first direction X at a pitch P2. The multiple strip portions 53 are aligned along the first direction X at a pitch P3. The pitches P1, P2, and P3 are different from each other. In the example shown in FIG. 8, the pitch P1 is greater than the pitch P2, and the pitch P3 is greater than the pitch P2, but note that the configuration is not limited to this.

In the example shown in FIG. 8, the length of the strip portions 51 along the second direction Y is greater than the lengths of the strip portions 52 and 53 along the second direction Y, and the length of the strip portions 52 along the second direction Y is greater than the length of the strip portions 53 along the second direction Y, but the configuration is not limited to this.

In the configuration example shown in FIG. 7, from the strip portion 51 to the strip portion 54, the length of the strip portion 50 along the second direction Y gradually becomes shorter. In other words, from the strip portion 51 to the strip portion 54, the second end portion 502 becomes gradually farther away from the edge portion E42 along the second direction Y. That is, the distance along the second direction Y that the light L1 progresses through inside the transparent substrate 30 while being repeatedly reflected becomes gradually shorter as it is located from the site of the strip portion 51 towards the strip portion 54. With this configuration, the intensity of light entering the pixel electrode PE3, which is most distant from the light-emitting element LD, becomes gradually low as it is located from the site of the strip portion 51 towards the strip portion 54, and the brightness of the pixel electrode PE3 gradually decreases as it is located from the site of the strip portion 51 towards the strip portion 54.

The length of the strip portions 50 along the second direction Y is at the minimum in the strip portion 54 and the maximum in the strip portion 51 adjacent to the strip portion 54 along the first direction X. That is, the distance along the second direction Y that the light L1 progresses through inside the transparent substrate 30 while being repeatedly reflected is shortest in the region overlapping the strip portion 54 and becomes larger drastically in the region overlapping the adjacent strip portion 51. With this configuration, the intensity of the light entering the pixel electrode PE3 increases sharply, causing the brightness of the pixel electrode PE3 to enhance sharply.

As described above, the brightness of the pixel electrode PE3 decreases gradually along the first direction X but increases sharply in a specific region. As a result, changes in brightness in the specific region may be particularly noticeable, making it easier to visually detect changes in brightness.

In the configuration example shown in FIG. 8, the multiple strip portions 50 having different lengths along the second direction Y are disposed randomly along the first direction X. That is, the distance along the second direction Y that the light L1 progresses through inside the transparent substrate 30 while being repeatedly reflected can be made random along the first direction X. With this configuration, the intensity of the light entering the pixel electrode PE3 can be made random, thereby suppressing the formation of regions where changes in brightness are particularly noticeable and also suppressing changes in brightness from becoming easy to visually detect.

As discussed above, in the configuration example shown in FIG. 8, the degradation of the display quality of images displayed on the display panel PNL can be further suppressed. Further, in such a configuration example as well, advantageous effects similar to those of the configuration example illustrated in FIG. 7 can be obtained.

The configuration examples shown in FIGS. 7 and 8 can be applied to either one of the display devices DSP shown in FIGS. 2 and 6.

As described above, according to the present embodiments, it is possible to provide a display device which can suppress a degradation in display quality.

In this embodiment, for example, the transparent substrate 10 corresponds to the first transparent substrate, the transparent substrate 20 corresponds to the second transparent substrate, the transparent substrate 30 corresponds to the light guide, the pixel electrode PE1 corresponds to the first pixel electrode, the pixel electrode PE2 corresponds to the second pixel electrode, the pixel electrode PE3 corresponds to the third pixel electrode, the pixel electrode PE4 corresponds to the fourth pixel electrode, the strip portion 51 corresponds to the first strip portion, the strip portion 52 corresponds to the second strip portion, and the strip portion 53 corresponds to the third strip portion.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a light guide;
a first transparent substrate;
a second transparent substrate disposed between the first transparent substrate and the light guide;
a plurality of light-emitting elements aligned along a first direction;
a liquid crystal layer disposed between the first transparent substrate and the second transparent substrate and containing strip-like polymers and liquid crystal molecules; and
a transparent layer disposed between the first transparent substrate and the light guide,
wherein
the transparent layer comprises a plurality of strip portions disposed along the first direction, extending along a second direction perpendicular to the first direction, and having a refractive index lower than that of the second transparent substrate,
each of the plurality of strip portions comprises a first end portion located on a light-emitting element side of the respective strip portion and a linear second end portion on an opposite side to the first end portion,
each of the plurality of strip portions comprises a first portion surrounded by the first end portion and a first edge and a second edge which face each other, and
the first edge and the second edge extend in directions different from each other.

2. The display device of claim 1, wherein
each of the plurality of strip portions further comprises a second portion connected to the first portion,
the first portion is disposed between the second portion and the light-emitting element, and the second portion is surrounded by the second end portion and a third edge and a fourth edge which face in parallel with each other.

3. The display device of claim 2, wherein
a width of the first end portion is greater than a width of the second end portion.

4. The display device of claim 2, wherein
a width of the first portion along the first direction gradually decreases as a location is farther away from the first end portion, and
a width of the second portion along the first direction is substantially constant.

5. The display device of claim 2, wherein
a length of the first portion along the second direction is greater than a length of the second portion along the second direction.

6. The display device of claim 2, wherein
the plurality of strip portions include a plurality of first strip portions and a plurality of second strip portions,
a length of the first portions of the plurality of first strip portions along the second direction is a same as a length of the first portions of the plurality of second strip portions along the second direction, and
a length of the second portions of the plurality of first strip portions along the second direction is different from a length of the second portions of the plurality of second strip portions along the second direction.

7. The display device of claim 1, wherein
the plurality of strip portions include a plurality of first strip portions and a plurality of second strip portions, and
a length of the plurality of first strip portions along the second direction is different from a length of the plurality of second strip portions along the second direction.

8. The display device of claim 7, wherein
the plurality of first strip portions and the plurality of second strip portions are disposed in a random order along the first direction.

9. The display device of claim 7, wherein
the plurality of first strip portions are disposed along the first direction at a predetermined pitch, and
the plurality of second strip portions are disposed along the first direction at a pitch different from the predetermined pitch.

10. The display device of claim 7, wherein
the plurality of first strip portions are disposed along the first direction at a predetermined pitch, and
the plurality of second strip portions are disposed along the first direction at a same pitch as the predetermined pitch.

11. The display device of claim 1, wherein
the plurality of strip portions include a plurality of first strip portions, a plurality of second strip portions, and a plurality of third strip portions,
a length of the plurality of second strip portions along the second direction is shorter than a length of the plurality of first strip portions along the second direction,
a length of the plurality of third strip portions along the second direction is shorter than a length of the plurality of second strip portions along the second direction, the plurality of first strip portions are disposed along the first direction at a predetermined pitch, the plurality of second strip portions and the plurality of third strip portions are disposed along the first direction at a same pitch as the predetermined pitch, the first strip portions, the second strip portions, and the third strip portions are disposed along the first direction in this order.

12. The display device of claim 1, wherein the transparent layer further comprises a frame portion surrounding the plurality of strip portions, the first end portion is connected to the frame portion, and the second end portion is spaced apart from the frame portion.

13. The display device of claim 12, further comprising:

a display area which displays images, and a non-display area surrounding the display area, wherein in plan view, the plurality of strip portions overlap the display area, and the frame portion overlaps the non-display area.

14. An illumination device comprising:

a light guide;

a plurality of light-emitting elements aligned along a first direction; and a transparent layer, wherein the transparent layer comprises a plurality of strip portions disposed along the first direction, extending along a second direction perpendicular to the first direction, and having a refractive index lower than that of the light guide, each of the plurality of strip portions comprises a first end portion located on a light-emitting element side of the respective strip portion and a linear second end portion on an opposite side to the first end portion, each of the plurality of strip portions comprises a first portion surrounded by the first end portion and a first edge and a second edge which face each other, and the first edge and the second edge extend in directions different from each other.

15. The illumination device of claim 14, wherein each of the plurality of strip portions further comprises a second portion connected to the first portion, the first portion is disposed between the second portion and the light-emitting element, and the second portion is surrounded by the second end portion and a third edge and a fourth edge which face in parallel with each other.

\*    \*    \*    \*    \*